J. Merrill,
Cask.
N° 58,452. Patented Oct. 2, 1866.
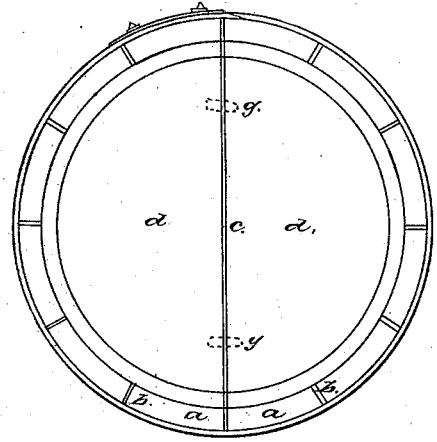
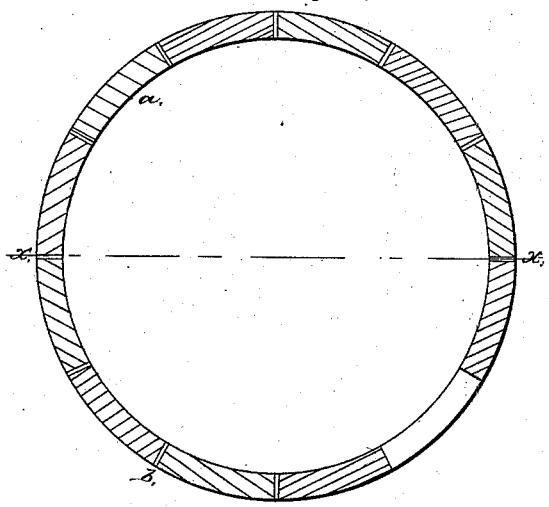
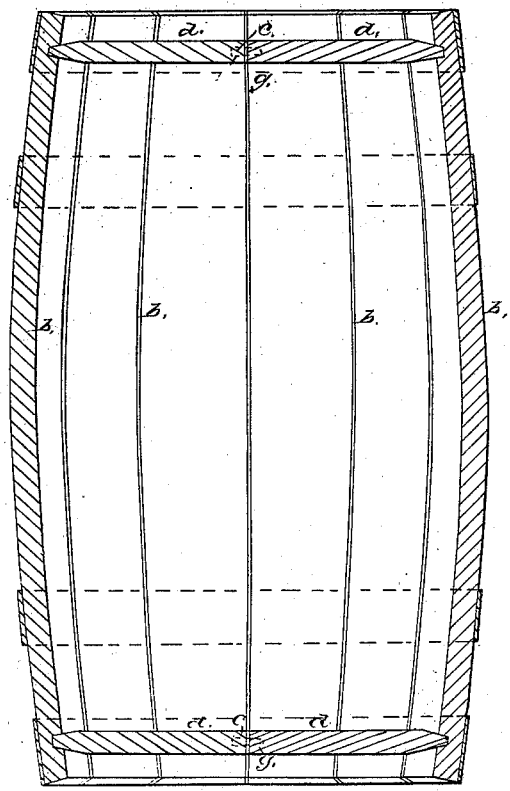
Witnesses:
Inventor:
Joshua Merrill

UNITED STATES PATENT OFFICE.

JOSHUA MERRILL, OF BOSTON, MASSACHUSETTS.

IMPROVEMENT IN BARRELS AND KEGS.

Specification forming part of Letters Patent No. 58,452, dated October 2, 1866.

*To all whom it may concern:*

Be it known that I, JOSHUA MERRILL, of the city of Boston, in the county of Suffolk and State of Massachusetts, have invented certain new and useful Improvements in Casks, Barrels, and Kegs suitable for Holding and Transporting Liquids; and I do hereby declare that the following is a full and correct description thereof, reference being had to the annexed drawings, and to the letters of reference thereon.

My invention consists in protecting the joints of ordinary casks, barrels, and kegs used for holding and transporting beer and other watery liquids against leakage by cementing them together with shellac, rosin, or other similar resinous cements applied to the joints before putting the casks together.

The drawings show a cask cemented at the joints.

Figure 1 is a top view of the cask; Fig. 2, a cross-section; Fig. 3, a vertical section through the heads and staves, and Fig. 4 a section of a stave.

In carrying out my invention, I take the staves *a* and head-pieces *d*, properly prepared for putting together, and apply a solution of shellac or rosin, or other similar resinous substance, to the joints *b*, by dipping or with a brush, and proceed to set up the cask and hoop it immediately.

Old casks may be treated in this way to great advantage, first taking them apart and cleaning the joints.

If the staves have been properly prepared, they can be trussed and the heads put in before the cement sets, especially if the staves and heads are from an old cask, or, if new, are bent and crozed before setting up. The driving up of the hoops forces the cement into the pores of the joints, imparting great strength to the cask when the cement sets, as well as preventing leakage.

The interior of the cask as well as the exterior may be varnished with shellac or rosin varnish when desired.

In making the shellac solution, I prefer to mix together in about equal proportions alcohol, ninety-five per cent., and coal-tar, naphtha, or benzole of about 32° Baumé's hydrometer; and to one pint of this mixture I put in a pound or a pound and a half of common gum-shellac. This makes a good thick varnish, and does not dry so rapidly as shellac dissolved in alcohol alone, thus giving more time to set up the cask after the cement is applied to the joints. Shellac will, however, answer if dissolved in alcohol alone or in caustic ammonia. Rosin cement may be made by dissolving in a pint of common naphtha one and a half pound of the rosin of commerce; or gum-dammar will answer as well.

I claim as of my invention and improvement in casks, barrels, and kegs suitable for holding and transporting liquids—

In combination with the joints of a cask suitable to hold and transport liquids having plain or straight joints, a coating or stuffing of shellac, rosin, or other similar resinous cement, applied to the joints and substantially in the way and for the purposes described.

JOSHUA MERRILL.

Witnesses:
 THEODORE M. PLIMPTON,
 GEORGE H. FOSTER.